United States Patent Office 2,765,435
Patented Oct. 2, 1956

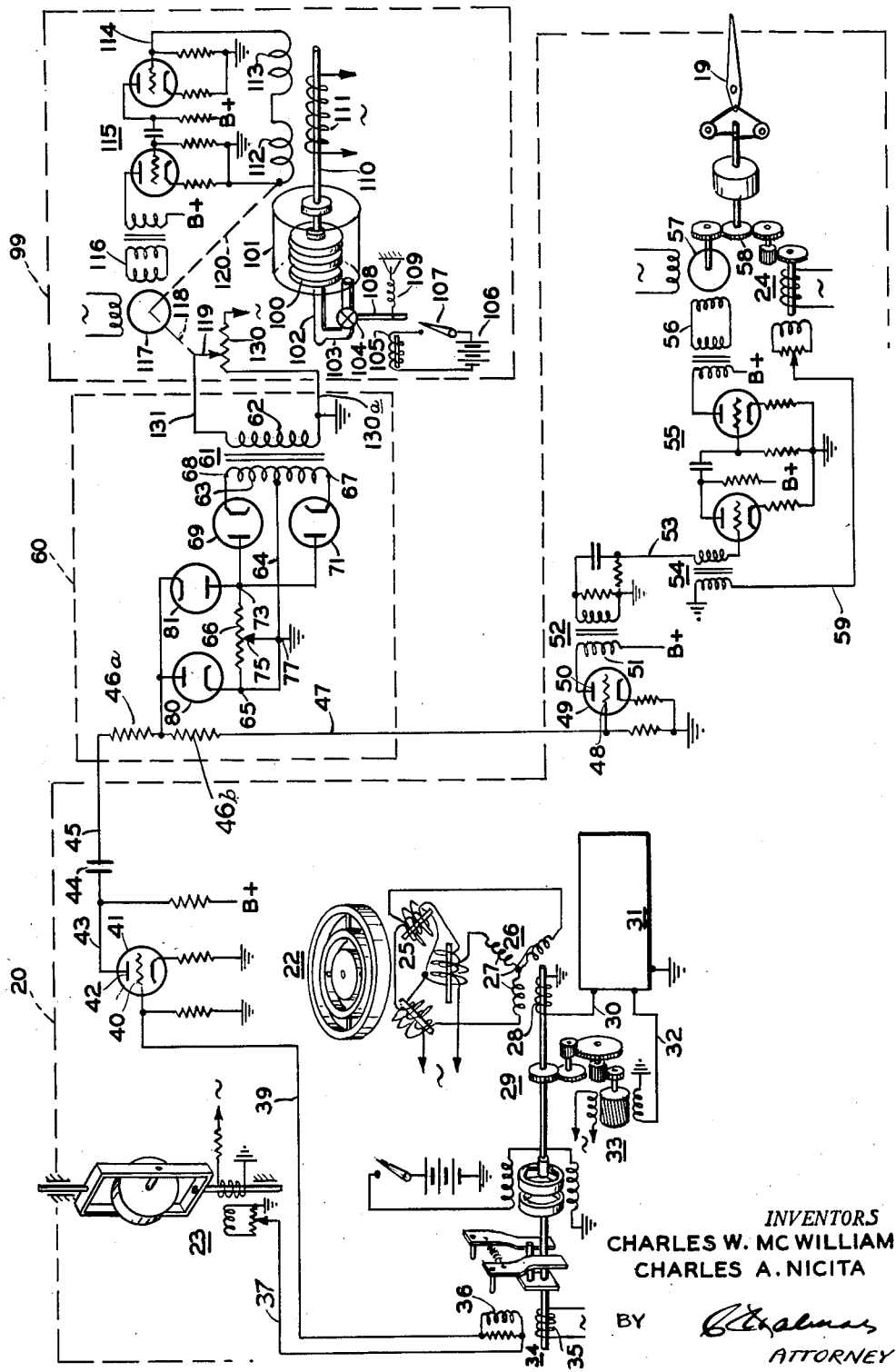

2,765,435

MAXIMUM DEFLECTION LIMITER FOR THE CONTROL SURFACES OF A MOBILE VEHICLE

Charles W. McWilliams, Arlington, N. J., and Charles A. Nicita, New York, N. Y., assignors to Bendix Aviation Corporation, Teterboro, N. J., a corporation of Delaware Application January 23, 1952, Serial No. 267,848

13 Claims. (Cl. 318—489)

The present invention generally relates to control apparatus for mobile vehicles and more particularly to control apparatus for automatically limiting the displaced or applied position of the vehicle control surface.

In mobile vehicles, such as aircraft, it is necessary to limit the lateral acceleration to which the structure of the vehicle is subjected when the vehicle is turning, ascending or descending. For example, at a given altitude and velocity, one way to limit such acceleration as, for instance, due to a lateral turning is to limit the control surface deflection. If the flight velocity or ground speed is reasonably constant, the maximum allowable deflection is a function of the air density. Thus, with increasing altitude where the air becomes less dense, the maximum allowable deflection becomes greater.

Setting the maximum control surface deflection limit for the lowest altitude will solve the problem to some extent. However, this solution sacrifices maneuverability at higher altitudes where a greater maximum deflection is permissible.

An object of the present invention, therefore, is to provide novel means for automatically varying the maximum allowable deflection for the control surface of a mobile vehicle in accordance with the parameter of movement or position of the vehicle.

Another object of the invention is to provide novel means to control the maximum acceleration to which the structure of a mobile vehicle is subjected when the vehicle is turning, climbing or diving.

A further object is to provide a novel steering apparatus for a vehicle in which the control signal is limited by an amount corresponding to a parameter of the movement or position of the vehicle.

A still further object is to provide a novel arrangement for continuously varying the maximum control of the surface of a mobile vehicle in accordance with a control parameter.

Another object is to provide a novel steering arrangement for an aircraft wherein the displacement of one or more of the craft control surfaces is modified in such a manner that for a given command signal less surface displacement is provided at low altitudes or high airspeeds than at high altitude or low airspeeds.

The above and further objects and novel features of the invention will appear more fully from the following detailed description when the same is read in connection with the accompanying drawing. It is to be expressly understood, however, that the drawing is for the purpose of illustration only and is not intended to define the limits of the invention.

The single figure of the drawing constitutes a schematic diagram of one embodiment of the present invention.

The novel lateral acceleration limiter of the present invention is shown for the purposes of illustration and better understanding in cooperative relationship with an automatic pilot. An embodiment of the rudder channel of an automatic pilot of the type disclosed in copending application Serial No. 516,488, filed December 31, 1943 by Paul Noxon et al., now U. S. Patent No. 2,625,348, is illustrated herein. The novel lateral acceleration limiter, however, is not limited to the particular automatic pilot or to the particular control channel disclosed.

The rudder channel control for the control of the aircraft about the yaw axis, generally designated as 20, is derived from a gyro-stabilized earth inductor compass 22 (although any heading indicator such as a directional gyro may be used), a rate of turn gyro take-off 23, and a follow-up device 24. Compass 22 develops a signal proportional to the amount of angular displacement of the craft from a prescribed heading. This signal is fed by means of leads 25 into a stator winding 27 of an inductive device 26 that is located within a master direction indicator 29. As a consequence, a directional displacement signal potential is induced within the rotor winding 28 of inductive device 26. This displacement signal is applied to the input of a vacuum tube amplifier 31 by way of lead 30. The output of amplifier 31 by means of lead 32 energizes motor 33.

Motor 33 not only operates to return rotor winding 28 of inductive device 26 to a null position but also operates to rotate the rotor winding 35 of a signal transmitter 34 to reproduce the directional displacement signal potential within the stator winding 36 thereof. The directional displacement signal potential reproduced within stator winding 36 of signal transmitter 34 is communicated toward the rudder channel servomotor 57 by way of lead 39.

Lead 39 is connected to the grid 40 of an amplifier tube 41. Plate 42 of amplifier 41 is connected by lead 43 through condenser 44, by lead 45 through resistor or impedance 46a, 46b, and by lead 47 to the grid 48 of a vacuum tube amplifier 49.

Plate 50 of the latter tube 49 is coupled by lead 51 and transformer 52 to lead 53 which, in turn, is connected to mixing transformer 54 for adding the signal component from follow up device 24. Transformer 54 is connected to the input of an amplifying system 55. The output of amplifying system 55 by means of lead 56 energizes the rudder servomotor 57 to displace rudder 19.

Connected in series with the directional displacement signal by means of lead 37 is a rate of turn signal developed by the rate of turn gyro take-off 23 in series with stator winding 36 of signal transmitter 34.

The output of the rudder channel amplifier 55 by means of leads 56 energizes a rudder servomotor 57 to displace rudder 19 through a speed reduction transmission system 58 to return the craft to its prescribed course. At the same time inductive follow-up device 24 is operated to develop an electrical follow-up signal that is fed by means of a lead 59 into the series circuit with the directional displacement and the rate of turn signals.

The above is, briefly outlined, a heretofore known automatic pilot system for one control channel of an aircraft, it being understood that any desired trim provision may be incorporated between direction signal transmitter 34 and the input of the servo amplifier. The novel lateral acceleration limiter of the present invention will now be described.

The voltage limiter, generally designated as 60, is fully described in copending application Serial No. 187,807, filed September 30, 1950 by Michael Kerpchar and now matured into U. S. Patent No. 2,683,226, dated July 6, 1954. The embodiment of the voltage limiter illustrated herein includes a full wave rectifier with a transformer 61 having primary winding 62 excited by an alternating voltage and a center-tapped secondary winding 63. The center-tap 64 of the secondary winding 63 is connected to one side 65 of a potentiometer 66. The opposite ends 67, 68 of the secondary winding 63 are connected through rectifiers 69, 71 of any suitable kind to a common junction at the other side 73 of potentiometer 66.

When transformer 61 is excited an alternating voltage four times the excitation potential appears across secondary winding 63. Rectifier 69 passes current during the half cycle when end 67 of secondary winding 63 is positive relative to center-tap 64. Rectifier 71 passes current during the half cycle when end 68 of secondary winding 63 is positive relative to center-tap 64. Accordingly, a pulsating voltage two times the excitation potential appears across potentiometer 66 with the side 73 positive relative to side 64.

An adjustable tap 75 on potentiometer 66 is grounded by lead 77. Tap 75 of potentiometer 66 is positive relative to the side 64 and negative relative to the side 73 of potentiometer 66.

Sides 64 and 73 are connected (1) through oppositely disposed rectifiers 80 and 81, respectively, to the output impedance 46b and lead 47 and (2) through a resistor 46a to the input lead 45 of the signal source. Resistors 46a, 46b may be of a high value.

When a sinusoidal signal appears on lead 45, rectifier 80 passes current when lead 77 is instantaneously negative relative to side 73 of potentiometer 66. Such current flow occurs only when the signal voltage is instantaneously greater than the excitation voltage appearing at transformer 61. The excitation voltage and the signal voltage must be in phase or 180 degrees out of phase with one another. In other words, the nulls of the excitation voltage and the signal voltage must occur simultaneously, otherwise the output voltage communicated by lead 47 will be distorted. The amplitude of the excitation voltage determines the limit of the output voltage.

When the amplitude of the signal potential is below the limiting value, then no current flows in the circuit including rectifiers 80, 81, potentiometer 66, and lead 77. The output voltage under this condition is identical to the signal input and appears at output lead 47.

When the amplitude of the signal exceeds the limiting value as determined by the excitation voltage, then current flows through the above circuit including rectifier 80 or rectifier 81 as determined by the phase of the input signal voltage. The output potential is restricted to the limiting value set by the excitation potential because of the voltage drop across resistor 46. Rectifiers 80 and 81, in effect, short circuit the portion of the signal which exceeds the limiting value.

In the embodiment illustrated herein, the excitation potential for the limiter is controlled as a function of ambient pressure conditions. Ambient pressure conditions as used herein are intended to include not only pressure changes due to varying craft altitude levels but also due to changes in the speed of the craft, etc. For example, a change in ambient pressure may occur as a result of change in craft altitude; again, a change in ambient pressure may occur as a result of the dynamic effect of a craft's movement through the air without a change in altitude.

Referring, now, to the drawing, the excitation potential for the limiter is controlled as a function of ambient pressure conditions due to a change in altitude, the ambient pressure condition being sensed by a barometric device.

As shown diagrammatically, the altitude control unit, generally designated as 99, comprises a bellows 100 mounted for expansion and contraction within a casing 101. The interior of the bellows is in direct communication with static pressures by way of a conduit 102. The interior of the casing is in communication with static pressure by way of a conduit 103. Normally, therefore, the bellows 100 is centered since it is exposed to static pressure on both sides.

Under certain conditions, the communication of static pressure to the casing 101 may be closed. To this end a suitable solenoid operated valve 104 is provided within the conduit 103. The solenoid comprises a coil 105 connected for energization with a battery 106 through a switch 107. An armature 108 is provided adjacent the coil and operatively connected with the valve. A spring 109 urges the armature in one direction to open the valve 104 when the switch 107 is open and the coil 105 deenergized and in an opposite direction to close the valve when the switch is closed and the coil energized.

When the switch 107 is closed, therefore, any change in static pressure such as that due to altitude changes is communicated to the interior of the bellows 100. Air of a selected density has been locked in casing 101. Accordingly, the bellows expands or contracts depending upon whether the external pressure rises or drops. Motion of the bellows is transmitted through a shaft 110 to a linearly displaceable winding 111.

Winding 111 is connected for energization with a suitable source of current. Winding 111 is normally centered with regard to a pair of windings 112 and 113 which are connected in series opposed relation. Thus with the movable, current conducting winding 111 centered, equal and opposite voltages are induced within windings 112, 113 and their net value is zero. However, motion of the movable winding 111 from its central or null position induces more voltage in one of the windings 112 and 113 and less in the other. Consequently, a differential exists and current will flow in one direction or another.

A pressure sensing device of the above type is more fully described in U. S. Patent No. 2,474,618 granted June 28, 1949 to Richard L. Divoll. However, the invention is not limited to this pressure sensing device as obviously various other conventional barometric devices or altimeters may be used.

One end of winding 112 is grounded. Lead 114 connects one end of winding 113 to the input of an amplifier system 115. The output of amplifier 115 is connected by leads 116 for the energization of a servomotor 117. Servomotor 117 is mechanically connected at 118 to tap 119 and at 120 to windings 112 and 113.

When a voltage differential exists between windings 112 and 113, a current flows through lead 114, is amplified at 115, and energizes servomotor 117. As servomotor 117 operates it moves windings 112 and 113 to a new null point or position relative to displaceable winding 111 where no differential exists between windings 112 and 113. At the same time servomotor 117 moves tap 119 to its new position on resistor 130.

Tap 119 is the take-off for a potentiometer comprised of (1) a resistor 130 having one end connected by a lead 130a to the ground junction of the primary winding 62 of transformer 61 and the other end energized by some suitable alternating power source and (2) a take-off 119 connected by a lead 131 to the other end of primary winding 62. Primary winding 62 supplies the excitation potential to the limiter 60.

*Operation*

Closing switch 107 energizes relay coil 105 closing valve 104 and locking the air in casing 101. This procedure may be carried out prior to craft take-off. Pressure changes in the air of the atmosphere are communicated by conduit 102 to the bellows 100 causing them to expand or contract. This bellows movement results in movement of rod 110 and winding 111, upsetting the balanced condition of the series opposed coils 112 and 113.

The current caused by the voltage differential in windings 112 and 113, amplified by amplifier system 115, drives servomotor 117 until windings 112 and 113 reach a null point again. Operation of servomotor 117 also moves tap 119 along resistance 130 to vary the potential across winding 62.

The amplitude of the signal appearing in lead 47, which constitutes the ultimate command signal communicated to the rudder servo amplifier, depends upon the excitation potential of limiter 60. The excitation current for this limiter is supplied by transformer 61. Therefore, since the excitation potential is controlled by a device 99 responsive to a parameter of movement of the vehicle and the excitation potential controls the signal strength in conductor 47, then the signal strength is a function of the parameter to which device 99 responds which, in this embodiment is altitude as sensed by air density.

The signal in lead 47 is an exact reproduction of the automatic control command signal from the sensor pickoffs 23 and 36. The signal, however, is on a scale limited by limiter 60.

When the air is dense, i. e., during craft flight at low altitudes, the signal from lead 39 that appears in lead 47 is limited to a small magnitude. Consequently, the maximum allowable deflection of the rudder control is small. Tap 119 is in such a position with respect to resistor 130 that only a small excitation potential appears at primary winding 62 of transformer 61. This excitation potential limits the value of the signal appearing in lead 47. When the ultimate command signal appearing on lead 45 is greater than the limiting value as determined by the excitation potential at winding 62 of transformer 61, rectifiers 80 or 81, depending upon the phase of the signal, operate to short circuit, in effect, that portion of the command signal which exceeds the limiting value through potentiometer 66 and tap 75 to ground lead 77. Of course, when the command signal potential appearing at lead 45 is less than the limiting value, the signal potential appearing at lead 47 is identical to the signal appearing at lead 45 and no current flows in the circuit including rectifiers 80, 81, potentiometer 66, tap 75, and lead 77.

As the aircraft ascends, for example, to higher altitudes where the atmosphere is rarified, the maximum allowable deflection of the control surface becomes greater. Pressure changes cause movement of shaft 110 and winding 111. This causes a differential voltage to exist in windings 112 and 113. The differential voltage energizes servomotor 117 to move windings 112 and 113 to a new null position and simultaneously moves tap 119 on resistor 130. The new position of tap 119 allows a greater potential to be applied to winding 62. Consequently, a greater command signal can appear in lead 45 and in lead 47 before any portion of the command signal is short circuited. The greater amplitude of the command signal, of course, results in a greater maximum deflection of the control surface.

In the embodiment described above, the lateral acceleration has been limited by limiting the maximum allowable deflection of the control surface as a function of one flight parameter of the vehicle-altitude, herein measured by a barometric device. It is obvious, however, that the novel arrangement is not restricted to altitude but may be used with indicators of other parameters such as airspeed, ground speed, etc. With an airspeed indicator for example, the resistor 130 and tap 119 would be so positioned as to diminish the maximum allowable deflection of the control surface with increase in airspeed.

The foregoing arrangement provides a novel means for continuously limiting a command signal for the control of a vehicle in response to a corresponding condition which the vehicle encounters. In the illustrated embodiment, the maximum allowable deflection of the craft control surface is varied continuously as the density of the air change when the aircraft ascends or descends.

While only one embodiment has been illustrated and described, various changes may also be made in the design and arrangement of parts illustrated without departing from the spirit and scope of the invention, as will now be understood by those skilled in the art.

We claim:

1. In apparatus of the class described, an impedance constituting an input for receiving a command signal, an impedance constituting an output for producing a voltage corresponding to said command signal, a servomotor responsive to said output voltage, a limiter means connecting said input and output for limiting the maximum magnitude of said output voltage, and a means responsive to ambient pressure conditions for modifying the limiting action of said limiter means so that the maximum magnitude of said output voltage varies as a function of ambient pressure condition.

2. An acceleration limiter for an aircraft having control surfaces thereon displaceable by a servomotor, comprising reference means for developing a control signal for said servomotor corresponding to craft deviation from a predetermined reference, and means connecting said reference means and said servomotor including limiter means for limiting the magnitude of said control signal, and a means responsive to ambient pressure conditions for modifying the action of said limiter means so that the maximum signal to said servomotor varies as a function of ambient pressure.

3. In an automatic steering system for a mobile vehicle, reference means for generating signals corresponding to vehicle departure from a predetermined reference for controlling said vehicle, limiter means connected to receive said signals for limiting the magnitude of the latter, and a means responsive to a predetermined flight parameter of the vehicle to modify the action of said limiter so that for the same departure from a predetermined reference, the maximum signal to said servomotor is varied as a function of said parameter.

4. In an automatic steering system for a mobile vehicle, a signal developing means for developing a control signal for said vehicle, said signal corresponding in sense and magnitude to the displacement of the vehicle from a predetermined reference, a limiter means connected to receive said signal and responsive to a predetermined flight parameter of the vehicle for limiting the magnitude of said signal, and a servomotor responsive to said limiter signal for controlling said vehicle, said limiter means including a means to shunt the portion of said control signal exceeding a predetermined magnitude and means responsive to said parameter for operating said shunting means as a function of said parameter.

5. In an automatic pilot for aircraft, reference means for developing a signal to control the aircraft, a limiter means connected with the reference means to limit the control signal magnitude including a pair of rectifiers adapted to shunt the portion of said signal that exceeds a predetermined amount, and a means responsive to a flight parameter of said craft to vary the shunting action of said rectifiers and thereby the limiting action of said limiter means so that the magnitude of the control signal varies as a function of said parameter.

6. In steering apparatus for a mobile vehicle, reference means for developing signals to control the course of said vehicle, a limiter connected to receive said signals for limiting the magnitude of said signals and a means responsive to a flight parameter of said vehicle to change the limits of magnitude of said signals as a function of said parameter.

7. An automatic pilot for an aircraft having a displaceable control surface, comprising reference means for developing a command signal adapted to displace said surface an amount corresponding to the amplitude of said signal, means connected to receive said signal which, when operated, varies the maximum amplitude of said signal, and means connected with said signal varying means for operating the latter in accordance with ambient pressure changes whereby the maximum displacement of said surface for a predetermined command signal is varied as a function of ambient pressure.

8. An automatic pilot for an aircraft having a displaceable control surface, comprising reference means for developing a command signal, a servomotor for displacing said surface an amount corresponding to the amplitude of said signal, limiting means interconnecting said reference means and said servomotor for receiving said signal, said limiting means including a pair of rectifiers having an energization applied thereto and adapted to shunt the portion of said control signal that exceeds a predetermined amount and being adapted for variable energization to thereby vary the amplitude of said signal, and ambient pressure change responsive means connected with said limiting means for variably energizing the latter.

9. An automatic steering system for an aircraft comprising reference means for generating a signal corresponding to departure of the craft from a predetermined reference, a servomotor for controlling the craft, and means interconnecting said reference means and said servomotor for operating the latter by said signal including a limiter means for said signal, said limiter means having a pair of rectifiers connected across said interconnecting means in parallel circuits with the polarities of the rectifiers in the circuits opposite, a variable strength alternating current source connected with said rectifiers so as to oppose current flow through said circuits, and means responsive to a flight parameter of said craft for varying the strength of said source.

10. In an automatic pilot for mobile craft having a control surface thereon actuated by a servomotor for controlling the attitude of said craft, means for developing a command signal corresponding to the deviation of the craft from a predetermined attitude, and means for transmitting said signal to said servomotor including impedance constituting an input for receiving said command signal, an impedance constituting an output for producing a signal corresponding to said command signal for controlling said servomotor, limiter means connecting said input and output for limiting the magnitude of the signal at said output, whereby the change in attitude may not be so great as to impose stresses on the craft exceeding a safe limit, and means responsive to ambient pressure conditions for modifying the limiting action of said limiter means so that the maximum signal at said output varies as a function of ambient pressure.

11. A system for operating the control surface of an aircraft, comprising a servomotor for positioning said surface with respect to said aircraft, signal means for developing a command signal for said servomotor, and transmission means connecting said signal means and said servomotor and having an input for receiving said signal, an output for delivering to said servomotor a signal voltage corresponding to said command signal, and limiter means for limiting the magnitude of the signal delivered at said output including a pair of rectifiers for shunting a portion of the command signal when it exceeds a predetermined magnitude, and a means responsive to ambient pressure conditions for modifying the action of said limiter means by changing the bias on said rectifiers, whereby the maximum signal is varied as a function of ambient pressure.

12. In an automatic steering system for a craft, reference means for developing a control signal whose amplitude and phase vary with the sense and magnitude of deviation of the craft from a predetermined reference, a servomotor for controlling said craft to correct for the deviation, and means for connecting said reference means and said servomotor for controlling the latter by the former, said connecting means including a pair of biased rectifiers adapted to shunt the portion of said signal that exceeds a predetermined amplitude, and means responsive to a flight parameter of said craft for varying the bias of said rectifiers, whereby the maximum signal received by said servomotor is varied as a function of said parameter.

13. In apparatus of the class described, an impedance constituting an input for receiving a signal corresponding to the extent of deviation from a predetermined heading, an impedance constituting an output for producing an output voltage corresponding to the signal but of limited maximum magnitude, a limiter means connected with said input and output for limiting the maximum magnitude of said output voltage, and a means responsive to ambient pressure conditions for modifying the limiting action of said limiter means so that the maximum magnitude of said output voltage is varied as a function of ambient pressure.

References Cited in the file of this patent
UNITED STATES PATENTS

| | | |
|---|---|---|
| 2,356,339 | Morrison | Aug. 22, 1944 |
| 2,387,795 | Isserstedt | Oct. 30, 1945 |
| 2,450,907 | Newton et al. | Oct. 12, 1948 |
| 2,474,618 | Divoll | June 28, 1949 |
| 2,511,846 | Halpert | June 20, 1950 |
| 2,552,348 | Shapiro et al. | May 8, 1951 |
| 2,608,351 | Smoot | Aug. 26, 1952 |